United States Patent
Chiaroni et al.

(10) Patent No.: US 7,209,666 B2
(45) Date of Patent: Apr. 24, 2007

(54) OPTICAL CLOCK RECOVERY DEVICE FOR RECOVERING THE CLOCK FROM AN OPTICAL SIGNAL

(75) Inventors: Dominique Chiaroni, Antony (FR); Bruno Lavigne, Antony (FR); Fabrice Devaux, Montrouge (FR); Bernd Sartorius, Berlin (DE); Carsten Bornholdt, Berlin (DE); Stephan Bauer, Berlin (DE)

(73) Assignee: Alcatel, Paris (FR)

( * ) Notice: Subject to any disclaimer, the term of this patent is extended or adjusted under 35 U.S.C. 154(b) by 692 days.

(21) Appl. No.: 10/145,889

(22) Filed: May 16, 2002

(65) Prior Publication Data

US 2002/0174378 A1    Nov. 21, 2002

(30) Foreign Application Priority Data

May 17, 2001    (FR) .................................. 01 06519

(51) Int. Cl.
*H04B 10/00* (2006.01)
(52) U.S. Cl. .................................................. 398/155
(58) Field of Classification Search ................ 398/155, 398/154, 176, 185, 101, 201
See application file for complete search history.

(56) References Cited

U.S. PATENT DOCUMENTS

| | | | |
|---|---|---|---|
| 4,079,339 A * | 3/1978 | Kobayashi et al. ........... 372/97 |
| 5,548,433 A * | 8/1996 | Smith ........................ 398/155 |
| 6,122,306 A * | 9/2000 | Sartorius et al. ............. 372/96 |
| 6,501,579 B2 * | 12/2002 | Li et al. ..................... 398/212 |

OTHER PUBLICATIONS

B. Sartorius et al., "System performance of an all-optical clock recovery module", Sep. 1998, ECOC'98, vol. 1, pp. 505-506.*
U. Feiste et al., "18 GHz all-optical frequency locking and clock recovery using a self-pulsating two-section DFB-laser", Jan. 1994, IEEE Photonics Technology Letters, vol. 6, pp. 106-108.*
B. Sartorius et al., "Dispersive self-Q-switching in self-pulsating DFB lasers", Feb. 1997, IEEE J. of Quantum Electronics, vol. 33, pp. 211-218.*
Sartorius B et al: "All-optical clock recovery module based on self-pulsating DFB laser", Electronics Letters, IEE Stevenage, GB, vol. 34, NR. 17, pp. 1664-1665.
Guifang Le et al.: "Nonlinear dynamics for all-optical 3R regeneration" LEOS 2000. 2000 IEEE Annual Meeting Conference Proceedings. 13th Annual Meeting, IEEE Lasers and Electro-Optics Society 2000 Annual Meeting (CAT. No. 00Ch37080), LEOS 2000. 2000 IEEE Annual Meeting Conference Proceedings, Rio Grande, Puerto Rico, 13-1, pp. 521-522, vol. 2, 2000, Piscataway, NJ, USA, IEEE, USA.

* cited by examiner

*Primary Examiner*—Jason Chan
*Assistant Examiner*—Quan-Zhen Wang
(74) *Attorney, Agent, or Firm*—Sughrue Mion, PLLC

(57) ABSTRACT

An all-optical clock recovery system for recovering the clock from a received optical signal with a short response time and without patterning effects includes a first optical clock recovery device adapted to supply a first optical clock signal in response to the received optical signal and a second optical clock recovery device adapted to supply a second optical clock signal in response to the first optical clock signal. Applications include regenerating optical packets in asynchronous optical packet-switched telecommunication networks.

4 Claims, 2 Drawing Sheets

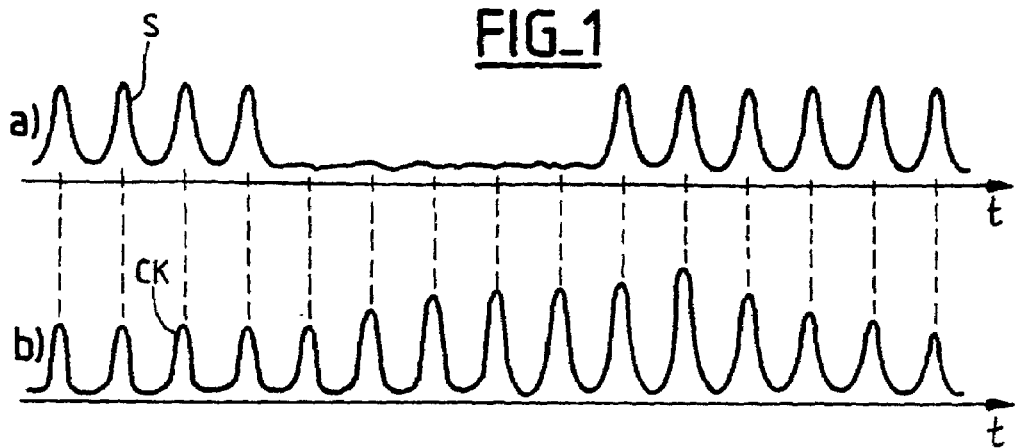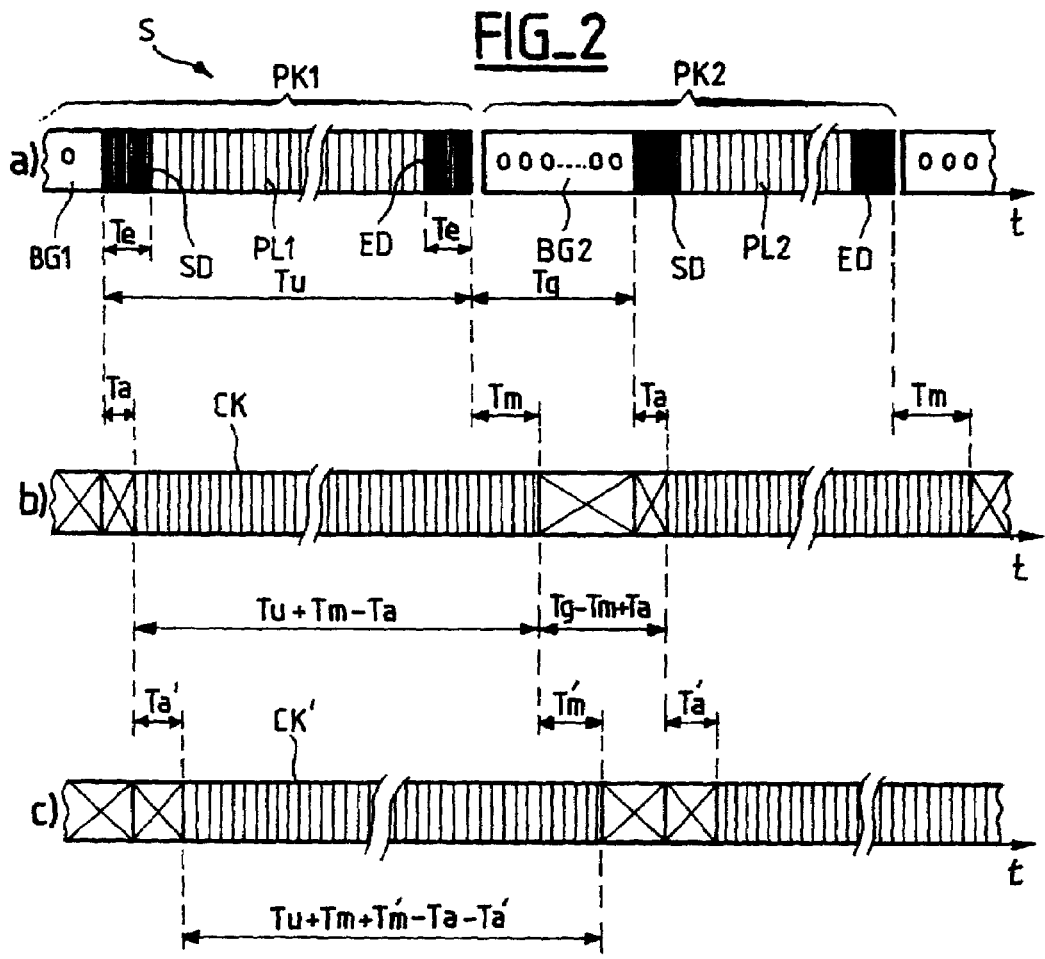

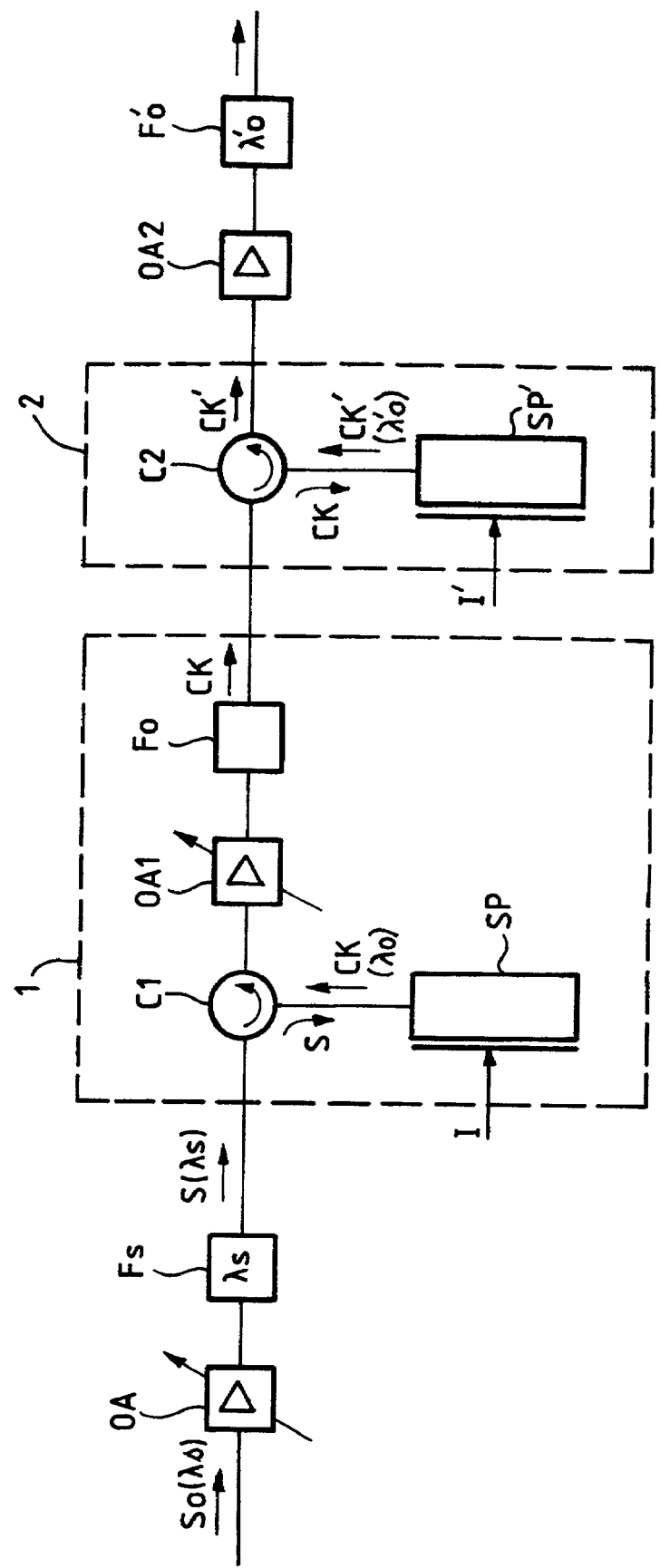
FIG_3

OPTICAL CLOCK RECOVERY DEVICE FOR RECOVERING THE CLOCK FROM AN OPTICAL SIGNAL

CROSS REFERENCE TO RELATED APPLICATIONS

This application is based on French Patent Application No. 01 06 519 filed May 17, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to optical telecommunications and in particular to transmission systems in which binary optical signals are conveyed in the form of amplitude modulation of a carrier wave, the modulation is synchronized by a clock and the signals are organized into packets of binary information.

The invention relates to the problem of recovering from a received binary optical signal a clock signal comprising a stream of pulses having a stable recurrence frequency equal to that of the clock bit rhythm of the received signal.

2. Description of the Prior Art

Clock recovery is of particular benefit in regenerator devices for reshaping and resynchronizing the modulation of received optical signals which are affected by jitter after transmission in a network.

Prior art clock recovery devices initially used electronic circuits to process the optical signal after converting it into an electrical signal. All-optical devices have appeared more recently that supply an optical clock signal from an optical signal to the RZ modulation format, bypassing the electrical domain.

All-optical clock recovery devices include mode-locked lasers and self-pulsating lasers. One example of a self-pulsating laser that can be used as a clock recovery device was described at the OFC'2000 conference, Baltimore, Mar. 5–10, 2000, in a paper by S. Bauer et al entitled "Ultrafast Locking Optical Clock for IP Packet Switching Applications", document TuF5, Mar. 7, 2000.

These all-optical clock recovery devices include a semiconductor optical amplifier medium inserted into a resonant cavity and into which is injected an electrical current slightly greater than a threshold current. This is known in the art. Laser oscillation can therefore become established, but leads to index variation and carrier density reduction in the medium, the effect of which is to interrupt the laser oscillation until a carrier density above the threshold is established again.

If no optical signal is injected into the amplifier medium, the device operates in a free oscillation mode. It emits pulses with one or more specific carrier wavelengths and having one or more specific repetition frequencies, as a function of the dimensions of the component and the magnitude of the injected current. If an optical wave amplitude-modulated at the rhythm of a clock having a frequency close to one of the specific repetition frequencies is injected into the amplifier medium, the device emits pulses at the rhythm of that clock.

Two characteristics of these clock recovery devices are the acquisition time and the holding time. The acquisition time Ta is the time for which the optical signal must be injected for the repetition frequency of the pulses to stabilize on the clock frequency of the signal. The holding time Tm is the time for which the repetition frequency remains stable after the signal disappears.

The acquisition and holding times depend firstly on respective binary sequences present at the start and at the end of the signal. The acquisition time is inversely proportional to the repetition rate of the pulses at the start of the signal (representing binary "1" in RZ modulation). The holding time is directly proportional to the pulse repetition rate at the end of the signal.

The acquisition and holding times also depend on the power of the injected signal: if the power increases, the acquisition and holding times decrease.

The above properties must be taken into account, especially in the case of clock recovery in asynchronous optical packet-switched transmission networks. This is because, in asynchronous optical packet-switched transmission networks, the packets formed at various sending points are received at switching nodes in which they are routed to transmission links corresponding to their respective destinations. Accordingly, the information takes the form of a succession of packets on the transmission links with diverse origins and whose clock rhythms have independent phases and frequencies that can be significantly different. Thus clock recovery must be effected at the rhythm of the received packets, which implies constraints on the acquisition and holding time of the clock recovery devices.

To define these constraints precisely, account is first taken of the fact that the switching nodes deliver to the regenerator devices packets comprising an unmodulated guard band followed by a modulated sequence called the payload. The payload starts with a preamble, continues with a sequence of information, and terminates with an end pattern. The guard band guarantees a low optical power during a particular minimum transmission time called the guard time Tg and aims to ensure a predefined minimum time-delay between sending on the same link of two successive payloads. Also, to facilitate clock recovery, the preamble and the end pattern comprise predefined sequences of successive "1" bits which, in the RZ format, correspond to successions of pulses at the rhythm of the signal bit clock.

The recovery device must then be in a position to supply a stable clock signal at the rhythm of the received packets and for a time period at least equal to the transmission time Tu of a payload. For this, a first condition is that the acquisition time Ta must be less than Tu, regardless of the sequence of information. In practice, this imposes that Ta must be less than the transmission time Te of the preamble.

Another condition is that the holding time Tm must be at least equal to the acquisition time Ta. However, given the existence of the end pattern, this condition is in practice always satisfied by the clock recovery devices previously mentioned.

Accordingly, the following conditions:

$$Ta \leq Tu, \quad (1)$$

and $$Ta \leq Tm, \quad (2)$$

are in practice reduced to the following condition:

$$Ta \leq Te. \quad (3)$$

As already mentioned, increasing the average optical power of the injected signal reduces Ta and Tm. Accordingly, condition (3) can be satisfied by adjusting this average power to a sufficient level, and this has been verified experimentally.

However, injecting a signal at a sufficient power level into the device gives rise to another problem due to a phenomenon called the patterning effect. This effect, which is directly proportional to the power of the signal, becomes apparent when the injected signal includes long sequences of "1" or "0" bits, and is reflected in amplitude modulation of the clock pulses and high jitter during sequences of "0" bits. This phenomenon is represented schematically by timing diagrams a) and b) in FIG. 1, respectively showing amplitude variations as a function of time in a signal S injected into a self-pulsating laser or like device and a resulting clock signal CK. The signal S includes a first sequence comprising successive "1" bits and then a sequence comprising successive "0" bits and then another sequence comprising successive "1" bits, and it can be seen that the pulses forming the clock signal CK have a lower amplitude during the sequences of "1" bits and a frequency drift during the sequence of "0" bits.

This amplitude modulation and jitter make the regenerator devices less effective. This is because, as the clock signal is intended to be modulated as a function of the modulation of the signal to be regenerated to constitute the regenerated signal, it is important for the clock signal to have the most stable possible amplitude. Similarly, because the clock rhythm of the regenerator signal is that of the recovered clock signal, the latter must be free of jitter.

The amplitude modulation of the clock signal could be eliminated by means of an all-optical equalizer device of a type known in the art, but an all-optical equalizer device is incapable of eliminating the jitter.

Thus an object of the invention is to provide a solution to the problem previously stated that is effective and provides a short acquisition time Ta, which can be less than the transmission time Te of the payload preamble, whilst reducing the patterning effect mentioned above.

SUMMARY OF THE INVENTION

To this end, the invention provides a system for recovering a clock from a received optical signal taking the form of amplitude modulation of an optical carrier wave, the modulation being synchronous with a clock rhythm, which system includes a first optical clock recovery device adapted to supply a first optical clock signal in response to the received optical signal and a second optical clock recovery device adapted to supply a second optical clock signal in response to the first optical clock signal.

Accordingly, unlike the received signal, the clock signal runs no risk of including long periods with no pulses. As a result of this the second clock recovery device supplies a second clock signal with improved stability of amplitude and frequency.

The clock signal supplied by a recovery device is more stable if the power of the injected signal is moderate. This is known in the art.

Thus, to take account of this other property of clock recovery devices, in the clock recovery system according to the invention, the first clock recovery device is adapted to supply the first clock signal with an optical power less than the optical power of the received optical signal.

In one embodiment of the invention the first and second clock recovery devices include first and second self-pulsating lasers respectively supplying the first and second clock signals with different carrier wavelengths.

The first and second self-pulsating lasers are advantageously identical components into which are respectively injected first and second electrical currents and the first electrical current is greater than the second electrical current.

This latter feature takes account of the fact that, for optimum operation, a self-pulsating laser used as a clock recovery device must be fed an electrical current suitable for the injected optical signal. To be more precise, it has been found that the electrical current must be increased as the optical power of the signal increases.

Other aspects and advantages of the invention will become apparent in the remainder of the description, which refers to the accompanying drawings.

BRIEF DESCRIPTION OF THE DRAWINGS

FIG. 1 shows two timing diagrams a) and b), already commented on, respectively showing an input signal fed to a standard clock recovery device and the resulting clock signal.

FIG. 2 shows three timing diagrams a), b) and c), respectively showing an input signal comprising successive packets and two clock signals formed by a clock recovery system according to the invention.

FIG. 3 shows one embodiment of a clock recovery system according to the invention.

DETAILED DESCRIPTION OF THE PREFERRED EMBODIMENT

The FIG. 2 timing diagrams represent the main signals operative in a clock recovery system according to the invention.

As shown in timing diagram a), the received signal S comprises successive packets PK1, PK2 each comprising a guard band BG1, BG2 followed by a payload PL1, PL2 containing the information data of the packet. The guard band has a transmission time Tg, called the guard time, during which the optical power is low. The existence of this guard time guarantees a predefined minimum time-delay between the reception of two successive payloads. The transmission time Tu of the payload of each packet is a function of the number of bits in the payload and the bit rate.

The payload includes a preamble SD at the start, followed by an information field, and finally an end pattern ED. The preamble and the end pattern comprise predefined sequences of successive "1" bits with a corresponding transmission time Te.

The timing diagram b) of FIG. 2 shows a first clock signal CK delivered by a first clock recovery device receiving the signal S. This device guarantees an acquisition time Ta between the end of each guard band, for example BG1, and the moment at which the pulses of the signal CK have acquired the rhythm of the clock of the signal S.

In this context, the first device always supplies a signal CK at the rhythm of the received packet if Ta$\leq$Te. This condition can be satisfied by setting the optical power of the received signal S to a sufficient level.

After the end of the payload PL1, the pulses of the signal CK remain stable for a limited time period that defines a holding time Tm. Accordingly, the signal CK supplies payload pulses for each packet during the time interval Tu+Tm−Ta.

As already indicated, given the existence of a preamble and an end pattern that are sufficiently long in practice, standard clock recovery devices always have a holding time greater than their acquisition time. Consequently, the time interval Tu+Tm−Ta is always greater than Tu.

The first clock signal CK is injected into a second clock recovery device which supplies a second clock signal CK' shown in timing diagram c) in FIG. 2. As previously, the second device guarantees an acquisition time T'a between the start of reception of the clock signal CK in its stable state and the moment at which the pulses of the signal CK' have acquired the rhythm of the clock CK. Also, for the second device to be in a position to supply a stable signal CK' at the rhythm of the received packets, it is sufficient for the above condition (4)T'a≦Tu+Tm−Ta to be complied with. Since Tu+Tm−Ta>Tu, the constraint on the acquisition time of the second clock recovery device is greatly reduced compared to that of the first clock recovery device.

After the disappearance of the clock CK in its stable state, the pulses of the signal CK' remain stable for a holding time T'm. Accordingly, the signal CK' includes payload pulses for each packet during the time interval Tu+Tm+T'm−T'a−Ta. Consequently, for the system to be in a position to supply a stable clock signal CK' during a time period at least equal to the transmission time Tu of each payload, it is necessary to comply with the condition Tu+Tm+T'm−Ta−T'a≧Tu, in other words for the following condition to apply:

$$Tm+T'm \geq T'a+Ta \quad (5)$$

As the holding times Tm and T'm are greater than the respective acquisition times Ta and T'a, condition (5) is always satisfied in practice.

The practical implementation of the clock recovery system according to the invention essentially consists in cascading a first optical clock recovery device and a second optical clock recovery device.

Accordingly, depending on the context of use (i.e. the optical power of the received signal S) and according to the chosen clock recovery device (i.e. the optical power of the clock signal that it supplies), if necessary, means are provided for amplifying or attenuating the optical powers of the received signal S and the first clock signal CK.

FIG. 3 shows, by way of example, one embodiment of a clock recovery system according to the invention. The system includes cascaded first and second clock recovery devices 1,2.

This embodiment assumes that the received signal S is derived from an input signal S0 whose optical power is insufficient. In this case, the system includes a first stage comprising an optical amplifier OA followed by a band-pass filter Fs tuned to the wavelength λs of the input signal S0 to eliminate the amplification noise produced by the amplifier OA. The signal at the output of the filter Fs then constitutes the received signal S containing the clock rhythm to be recovered.

The first clock recovery device 1 includes a three-port circulator C1. A first port receives the signal S, a second port is coupled to a self-pulsating laser SP, and the third port supplies the first clock signal CK delivered by the laser SP. The self-pulsating laser SP is a semiconductor component, for example as described in the publication previously cited. This component has a plurality of sections including a gain section fed with an appropriate electrical current I so that it delivers optical pulses with a given carrier wavelength λ0 and having a recurrence frequency imposed by the clock rhythm of the signal S. These pulses therefore constitute the first clock signal CK.

The gain of the amplifier OA is chosen or set so that the acquisition time Ta of the self-pulsating laser SP does not exceed the time period required by the context of use.

The second device 2 simply comprises a three-port circulator C2 and a second self-pulsating laser SP'. A first port of the circulator C2 receives the first clock signal CK, a second port is coupled to the second self-pulsating laser SP', and the third port constitutes the output of the device 2. The second self-pulsating laser SP' delivers optical pulses with a given carrier wavelength λ'0, different from λ0, and having a repetition frequency imposed by the clock rhythm of the signal S. These pulses constitute the second clock signal CK' available at the third port of the circulator C2.

To reduce the patterning effect present in the signal CK at the output of the first self-pulsating laser SP, the first clock recovery device 1 must supply to the second device 2 a clock signal whose optical power is less than that of the received optical signal S. To this end, means can be provided at the output of the first self-pulsating laser SP for adjusting the optical power of the signal supplied to the second device 2. The adjustment can be an attenuation or an amplification, depending on the types of lasers used.

Accordingly, as shown here, if the optical power of the clock signal CK supplied by the self-pulsating laser SP is insufficient, the third port of the circulator C1 is coupled to an optical amplifier OA1, for example a variable gain amplifier, followed by a band-pass filter F0. The band-pass filter F0 eliminates the amplification noise produced by the amplifier OA1 and transmits the wavelength λ0 on the first clock signal CK.

It is further necessary to ensure that the polarization of the first clock signal CK is compatible with the second self-pulsating laser SP'. To this end, the two devices 1 and 2 can be coupled by an appropriately oriented polarization-maintaining fiber.

If necessary, the third port can be coupled to an optical amplifier OA2 followed by a band-pass filter F'0 for eliminating amplification noise produced by the amplifier OA2 and transmitting the wavelength λ'0 of the second clock signal CK'.

From the practical implementation point of view, one or more of the following options can be adopted:

The first and second self-pulsating lasers SP, SP' are identical components into which are respectively injected first and second electrical currents I and I'. To allow for the fact that the optical power of the signal S received by the first self-pulsating laser SP is greater than that of the signal CK received by the second self-pulsating laser SP', the first current I is greater than the second current I'.

The wavelength λ'0 of the second clock signal CK' is identical to the wavelength λs of the received signal S. This is of particular benefit in a regenerator when the signal CK' supplies the carrier wave of a regenerated signal. The regenerator is then transparent as far as the wavelength is concerned.

The optical amplifiers OA and OA1 are variable gain amplifiers.

Finally, a few values obtained from experiments on the above embodiment are given below.

The payload and the guard band respectively containing 10 kbits and 256 bits, at a bit rate of 10 Gbit/s, Tu=974.4 ns and Tg=25.6 ns.

With an optical power of the signal S of 2 dBm, the acquisition and holding times of the first recovery device 1 were respectively Ta=2 ns and Tm=4 ns.

The same acquisition and holding time values can be obtained for the second recovery device 2 with an optical power of −2 dBm for the clock signal CK applied to the second self-pulsating laser SP'.

This confirms that all of the conditions previously discussed can be readily satisfied.

There is claimed:

1. A system for recovering a clock signal from an optical signal which is received as an amplitude modulation of an optical carrier wave, wherein said amplitude modulation is synchronized with a clock rhythm, said system comprising:
   a first optical clock recovery device which receives said optical signal and supplies a first optical clock signal in response to said optical signal which is received; and
   a second optical clock recovery device which receives said first optical clock signal from said first optical clock recovery device and supplies a second optical clock signal in response to said first optical clock signal which is received,
   wherein optical power of said first optical clock signal, which is supplied by said first clock recovery device, is less than optical power of said optical signal which is received,
   wherein said first clock recovery device and said second clock recovery device comprise a first self-pulsating laser and a second self-pulsating laser, respectively, which respectively supply said first clock signal and said second clock signal, wherein carrier wavelengths of said first clock signal and said second clock signal are different.

2. The system for recovering a clock signal as claimed in claim 1, wherein a first electrical current is injected into said first self-pulsating laser, a second electrical current, which is less than said first electrical current, is injected into said second self-pulsating laser, and said first self-pulsating laser and said second self-pulsating laser are identical components.

3. The system for recovering a clock signal as claimed in claim 1, wherein carrier wavelengths of said second clock signal, which is supplied by said second clock recovery device, and said optical signal are identical.

4. The system for recovering a clock signal as claimed in claim 1 wherein said optical signal which is received comprises successive packets which each include a payload which starts with a preamble and ends with an end pattern, said preamble and said end pattern comprise predefined sequences of successive "1" bits, and said clock recovery system further comprises an optical power adjustment device which adjusts optical power of said optical signal which is received such that the optical power is sufficient for said acquisition time of said first clock recovery device to be less than the transmission time of said preamble.

* * * * *